(12) United States Patent
Ramoutar et al.

(10) Patent No.: US 8,979,174 B2
(45) Date of Patent: Mar. 17, 2015

(54) SMALL OVERLAP FRONTAL IMPACT COUNTERMEASURE

(71) Applicant: Toyota Motor Engineering & Manufacturing North America, Inc., Erlanger, KY (US)

(72) Inventors: Naipaul D. Ramoutar, Ann Arbor, MI (US); Taichi Yamashita, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/327,232

(22) Filed: Jul. 9, 2014

(65) Prior Publication Data

US 2014/0319861 A1    Oct. 30, 2014

Related U.S. Application Data

(63) Continuation of application No. 13/865,678, filed on Apr. 18, 2013, which is a continuation-in-part of application No. 13/633,406, filed on Oct. 2, 2012.

(51) Int. Cl.
*B60R 19/24* (2006.01)
*B62D 21/15* (2006.01)
*B60R 19/04* (2006.01)

(52) U.S. Cl.
CPC .............. *B60R 19/24* (2013.01); *B62D 21/152* (2013.01); *B60R 19/04* (2013.01); *B60R 2019/247* (2013.01)
USPC .................... 296/187.09; 296/187.1; 293/155

(58) Field of Classification Search
USPC ........... 296/187.09, 187.1; 293/132, 133, 155
See application file for complete search history.

(56) References Cited

U.S. PATENT DOCUMENTS

| 4,333,674 A | 6/1982 | Buettner et al. |
| 6,174,009 B1 | 1/2001 | McKeon |

(Continued)

FOREIGN PATENT DOCUMENTS

| DE | 10240264 A1 | 3/2004 |
| JP | 2004306871 A | 11/2004 |
| JP | 2005178547 A | 7/2005 |

OTHER PUBLICATIONS

Non-Final Office Action mailed Jun. 4, 2013 for U.S. Appl. No. 13/633,406, filed Oct. 2, 2012.

(Continued)

*Primary Examiner* — Joseph D Pape
(74) *Attorney, Agent, or Firm* — Dinsmore & Shohl LLP

(57) ABSTRACT

A countermeasure assembly for an automotive vehicle includes a front side rail extending in a generally longitudinal direction; a bumper having a main bumper member and a bumper extension forming an end portion of the bumper; and a pivot link having front and rear mounting portions. The front mounting portion is pivotably engaged with the bumper extension member to define a front pivot joint, and the rear mounting portion is pivotably engaged with the front side rail to define a rear pivot joint. The rear pivot joint is located rearward and inward from the front pivot joint. The bumper extension is bolted to the forward end of the front side rail. The bumper extension has a front member and a rear member, of which the rear member is bolted to the front side rail. The front member and the rear member of the bumper extension define a hollow box structure.

20 Claims, 12 Drawing Sheets

(56) References Cited

U.S. PATENT DOCUMENTS

| | | |
|---|---|---|
| 6,957,846 B2 | 10/2005 | Saeki |
| 7,559,589 B2 | 7/2009 | Nees |
| 7,748,507 B2 | 7/2010 | Canot et al. |
| 7,819,218 B2 | 10/2010 | Eichberger et al. |
| 7,926,847 B2 | 4/2011 | Auer et al. |
| 2004/0195862 A1* | 10/2004 | Saeki .................... 296/187.09 |

OTHER PUBLICATIONS

Final Office Action mailed Dec. 31, 2013 for U.S. Appl. No. 13/633,406, filed Oct. 2, 2012.

Non-Final Office Action mailed Aug. 9, 2013 for U.S. Appl. No. 13/865,678, filed Apr. 18, 2013.

Final Office Action mailed Jan. 17, 2014 for U.S. Appl. No. 13/865,678, filed Apr. 18, 2013.

Notice of Allowance mailed Apr. 15, 2014 for U.S. Appl. No. 13/865,678, filed Apr. 18, 2013.

* cited by examiner

SMALL OVERLAP FRONTAL IMPACT COUNTERMEASURE

CROSS REFERENCE TO RELATED APPLICATIONS

This application is Continuation of U.S. patent application Ser. No. 13/865,678, entitled "SMALL OVERLAP FRONTAL IMPACT COUNTERMEASURE," filed on Apr. 18, 2013, which is a Continuation in Part of U.S. patent application Ser. No. 13/633,406, filed on Oct. 2, 2012. The entire content of both applications is hereby incorporated by reference.

BACKGROUND

1. Technical Field

The present specification generally relates to a structural assembly in a vehicle. More specifically, the present specification relates to an impact countermeasure assembly that responds to a frontal impact, such as a small overlap impact, to limit the frontal impact force on the vehicle cabin.

2. Description of Related Art

Automotive vehicles are often constructed at their front ends to include various support structure for the engine, wheels, suspension, bumper, and related components. These support structures can include members that are generally aligned with the longitudinal axis of the vehicle, that run in a generally transverse direction relative to the longitudinal members or at oblique angles to these axes. The support structures surrounding and supporting the engine compartment are ultimately connected to various structures that define the vehicle cabin. These cabin support structures can include a generally vertical door hinge pillar, the A-pillar that extends from the door hinge pillar to the roof of the vehicle, a laterally extending cross beam, a floor pan running across the width of the vehicle, and a rocker member extending rearward from the bottom of the hinge pillar.

These support structures provide support for various vehicle components, as well as exterior structures, that are mounted thereto. Examples of vehicle components include the engine, transmission, radiator, suspension, wheels, and the like. Examples of exterior structures include the doors, roof, windshield, floor panels, hood, and the like. In addition to providing support for the various vehicle parts, the support structure also operates to protect the vehicle occupants in the event of a collision, such as a frontal impact collision.

One type of frontal impact collision is known as a small overlap impact. A small overlap impact is an impact where the majority of loading due to the impact occurs outside of the major longitudinal support structures of the vehicle. A small overlap impact can occur in a variety of ways, such as a head on collision with a tree or post, a vehicle to vehicle oblique collision, or a vehicle to vehicle collinear or head-on collision.

Because the majority of the loading is outside the longitudinal support structures, the impacting body or "barrier" can result in the longitudinal support structure slipping off the barrier. Put another way, the vehicle longitudinal support structures may deform laterally inward relative to the barrier or provide limited interaction with the barrier. The barrier could continue to exert a longitudinal force toward the vehicle, with the force generally aligned with the wheel of the vehicle due to the relative lateral translation. Upon impact with the wheel, the force may be transmitted further toward the rear of the vehicle and toward the passenger cabin. The barrier and wheel would then exert a force upon the hinge pillar, the rocker, the A-pillar, the floorpan, and cross beam, each of which are at least partially aligned with the barrier during this type of collision. These structures can ultimately deform due to the collision with the barrier, resulting in encroachment of the structures upon the passenger cabin.

One solution to these issues of cabin encroachment has been to reinforce the longitudinal support structure and the support structures that surround the cabin, so as to limit the deformation of these structures. However, the additional reinforcement can result in substantial increases in vehicle mass and material, which are undesirable in terms of cost and fuel mileage.

SUMMARY

In overcoming the enumerated drawbacks and other limitations of the known art, the present specification provides a countermeasure assembly for an automotive vehicle that comprises a front side rail extending in a generally longitudinal direction and having a forward end; a bumper having a main bumper member and a bumper extension forming an end portion of the bumper, the bumper extending generally transverse and lateral to the longitudinal direction of the front side rail, the bumper extension extending laterally from the main bumper member and forming an outboard end of the bumper, the bumper extension being mounted to the forward end of the front side rail; and a pivot link having front and rear mounting portions, the rear mounting portion being pivotably engaged with the bumper extension member to define a front pivot joint, the rear mounting portion being pivotably engaged with the front side rail to define a rear pivot joint, the rear pivot joint being located rearward and inward relative to the front pivot joint.

In another aspect, the bumper extension has a front member and a rear member, the rear member being bolted to the forward end of the front side rail.

In yet another aspect, the front member and the rear member of the bumper extension define a hollow box structure.

In an additional aspect, the rear pivot joint includes a pivot bracket that engages the rear mounting portion and fastened to an outer wall of the front side rail, the front side rail defining a box structure including the outer wall and having an inner wall, an upper wall and a lower wall.

In a further aspect, the outer wall defines a vertical width of the front side rail, the pivot bracket having a base defining a length greater than the vertical width of the front side rail.

In yet another aspect, the base of the pivot bracket is further fastened to a lower extension, the lower extension extending downward from the lower wall of the front side rail.

In an additional aspect, the lower extension defines an outer wall that is generally planar with the outer wall of the front side rail.

In a further aspect, the lower extension defines a box structure.

In an additional aspect, a bulkhead with a flange is disposed inside the front side rail, the flange being bolted to the pivot bracket via the front side rail.

In another aspect, the bulkhead extends across the entire width of a cavity defined by the box structure of the front side rail.

In yet another aspect, the pivot bracket, and the bulkhead are arranged laterally outward from and longitudinally overlapping with an engine of the automotive vehicle.

In still a further aspect, the pivot link has first, second, and third major side surfaces, the first major side surface facing the bumper, the second major side surface facing the front side rail, and the third major side surface facing away from the bumper and extending between the rear and rear mounting portions of the pivot link.

In another aspect, the first major side surface is not parallel with the third major side surface.

In still another aspect, the first major side surface and the third major side surface define an angle therebetween that is less than 90°.

In an additional aspect, the first major side surface includes an undercut, the undercut being defined wherein a lower portion of the first major side surface is recessed relative to an upper portion of the first major side surface.

In another aspect, a center of the front pivot joint is offset from a center of the rear pivot joint in a vertical direction relative to the vehicle.

In still another aspect, the center of the front pivot joint is located vertically higher relative to the vehicle than the center of the rear pivot joint.

In yet another aspect, the rear mounting portion of the pivot link exhibits a thickness that is less than a thickness defined by the rear mounting portion of the pivot link.

In a further aspect, the pivot link is a generally triangular shaped body.

Further objects, features and advantages of the embodiments described herein will become readily apparent to persons skilled in the art after a review of the following description, with reference to the drawings and claims that are appended to and form a part of this specification.

DETAILED DESCRIPTION

Figure 1:
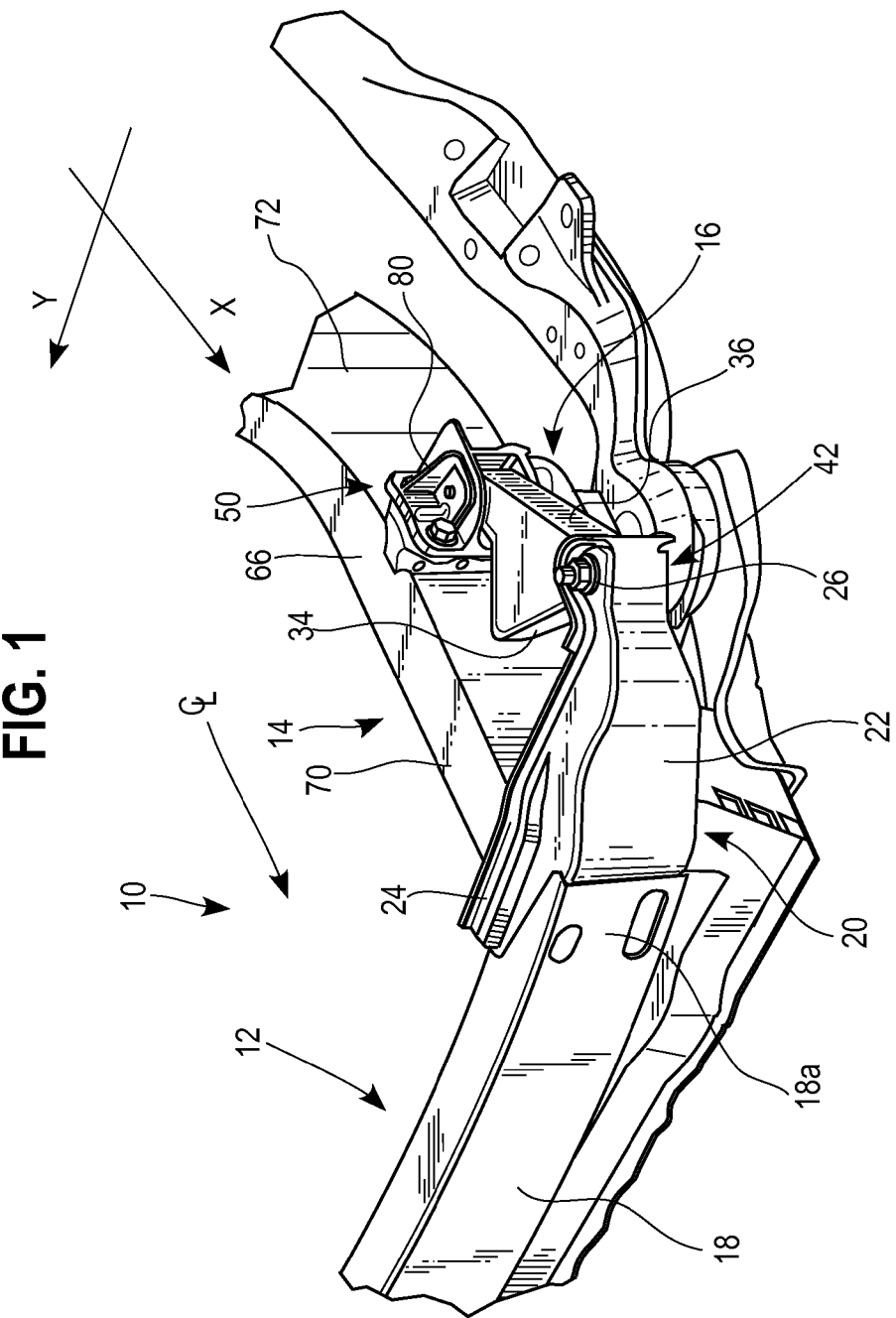
FIG. 1 is an isometric view of a countermeasure assembly incorporating the principles of the embodiments of the present specification.
Figure 2:
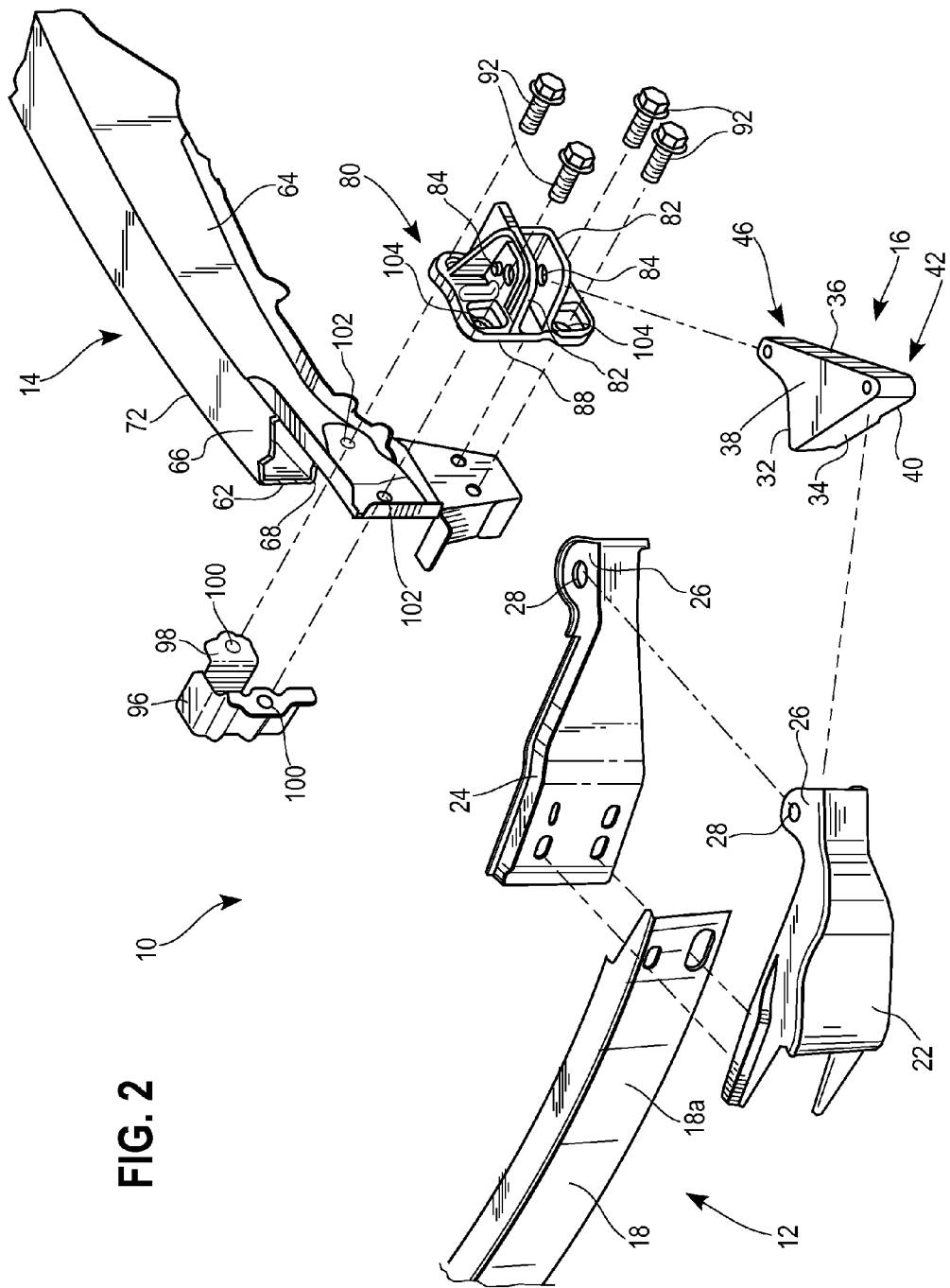
FIG. 2 is an exploded view of the countermeasure assembly seen in FIG. 1.

Referring now to the drawings, FIG. 1 illustrates a small overlap impact countermeasure assembly 10 (hereafter just "countermeasure assembly 10") for an automotive vehicle and incorporating the principles of embodiments of the present specification. As its principle components, the countermeasure assembly 10 includes a bumper 12, a front side rail 14 and a pivot link 16 extending between the bumper 12 and the front side rail 14. The countermeasure assembly 10 is disposed at the front end of the vehicle and generally surrounds the engine E (see FIG. 3) of the vehicle, with the wheels of the vehicle being disposed laterally outboard of the front side rail 14 and rearward of the pivot link 16.

For reference, the countermeasure assembly 10 defines an x-axis X that is generally parallel to a fore-and-aft longitudinal centerline CL of the vehicle. The countermeasure assembly 10 also defines a y-axis Y that extends laterally across or perpendicular to the centerline CL. Also, for the purpose of clarity in this description, the terms "inward" or "inboard" generally refer to a direction toward the centerline CL of the vehicle, and the terms "outward" or "outboard" refer to a direction away from the centerline CL of the vehicle. Similarly, "front" or "frontward" generally refer to direction toward the front of the vehicle and "rear" or "rearward" refers to a direction toward the rear of the vehicle.

Furthermore, only one countermeasure assembly 10 is illustrated in the figures and described herein. That countermeasure assembly 10 is located on the front left side of the vehicle. It will be appreciated that a corresponding countermeasure assembly is also located on the front right side of the vehicle. The front right side countermeasure assembly is a mirror image of the left side countermeasure assembly 10 and operates in a similar fashion. Accordingly, only the front left side countermeasure assembly 10 is discussed herein.

Figure 3:
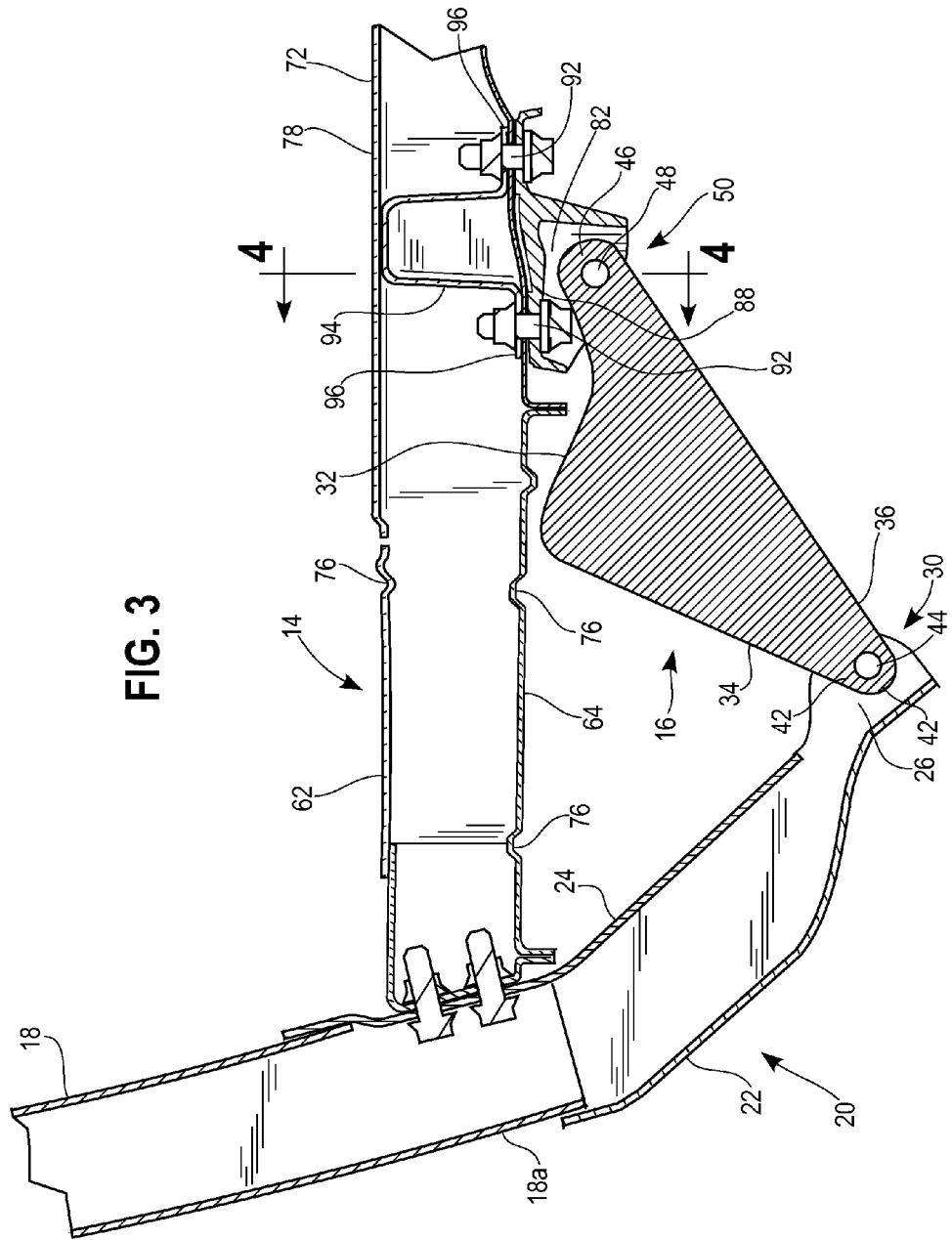
FIG. 3 is a cross-sectional plan view of the countermeasure assembly seen in FIG. 1.

The illustrated bumper 12 is located at the front of the vehicle and extends laterally across the vehicle in a manner known in the art. The front side rail 14 is a longitudinal member of the vehicle's frame and extends forward, generally parallel to the X-axis, from other components of the vehicle's frame until being connected to the bumper 12 at the front of the vehicle, as is generally shown in FIG. 3. The pivot link 16 is mounted to both the bumper 12 and the front side rail 14. By virtue of the pivot link 16, a force acting on the bumper 12 will be transferred to the front side rail 14 be it to different, but related, mechanisms. The force will be directly transferred from the bumper 12 to the front side rail 14 via the connection between those two members. Additionally, the force acting on the bumper 12 will be indirectly transferred from the bumper 12 through the pivot link 16 to the front side rail 14. This is particularly important when the vehicle is subjected to a small overlap frontal impact.

The bumper 12 includes a main bumper member 18 and a pair of bumper extensions 20, which are mounted to the left and right ends 18a of the main bumper 18. As seen in FIG. 1, the bumper extension 20 extends outward and slightly rearward from the left end portion 18a of the main bumper 18 and can have a generally curved shape, although the extension 20 could also have a more straight shape, bent shape, or other suitable shape. In one form, the bumper extension 20 is mounted to the bumper 12 via a mechanical connection using bolts, screws, or the like; however, other attachment methods could also be used. In the illustrated embodiment, the bumper extension 20 is itself formed of two pieces, a front member 22 and a rear member 24. The two members 22, 24 collectively define a box structure of increased strength and reduced weight. This hollow form of the bumper extension 20 also allows the bumper extension 20 to be deformed during a collision, while maintaining a connection to the main bumper member 18.

At its laterally outward end, the bumper extension 20 is provided with a pair of opposed, generally horizontal flanges 26. The flanges 26 have apertures 28 formed therein that cooperate to receive the pivot link 16 therebetween and to define, with the pivot link 16, a front pivot joint 30.

Preferably, the pivot link 16 is a fixed and solid body portion having three major side surfaces: inner surface 32, a forward surface 34 and an outer surface 36, as well as upper and lower surfaces 38 and 40. The pivot link 16 is preferably of a one-piece construction so that, in the event of a collision, the pivot link 16 can better withstand forces exerted against it and so that it can transmit a reaction force therethrough. It will be noted that this is in contrast to the hollow form construction of the bumper extension 20.

The normal operating position of the pivot link 16 relative to the bumper 12 and front side rail 14 is seen in FIG. 3. This position represents the position of the pivot link 16 prior to any frontal impact/collision involving the countermeasure assembly 10. As seen therein, the inner surface 32 of the pivot link 16 generally faces inward toward the front side rail 14. The outer surface 36 generally faces rearward and outward. The forward surface 34 generally faces forward toward the bumper extension 20, but is also slightly oriented inward toward the front side rail 14. In the event of a small overlap frontal impact, the pivot link 16 will be caused to rotate or pivot and the orientations of these various surfaces will change, as further described in detail below. Additionally, the forward surface 34 of the pivot link 16 includes an undercut 52. In other words, a lower portion 54 of the forward surface 34 is recessed or positioned rearward relative to an upper portion 56 of the forward surface 34. The purpose for this undercut 52 is further discussed below.

Generally at the juncture of the forward surface 34 and the outer surface 36, the pivot link 16 defines a front mounting portion 42 with a vertical pivot bore 44 defined therethrough, which cooperate with the opposed flanges 26 to form the front pivot joint 30. At the juncture of the inner surface 32 and the outer surface 36, the pivot link 16 defines a rear mounting portion 46. The rear mounting portion 46 similarly includes a pivot bore 48 that operates as part of a rear pivot joint 50. Relative to the position of the front side rail 14, the front pivot joint 30 is located laterally outward and the rear pivot joint 50 is located laterally inward.

Figure 7:
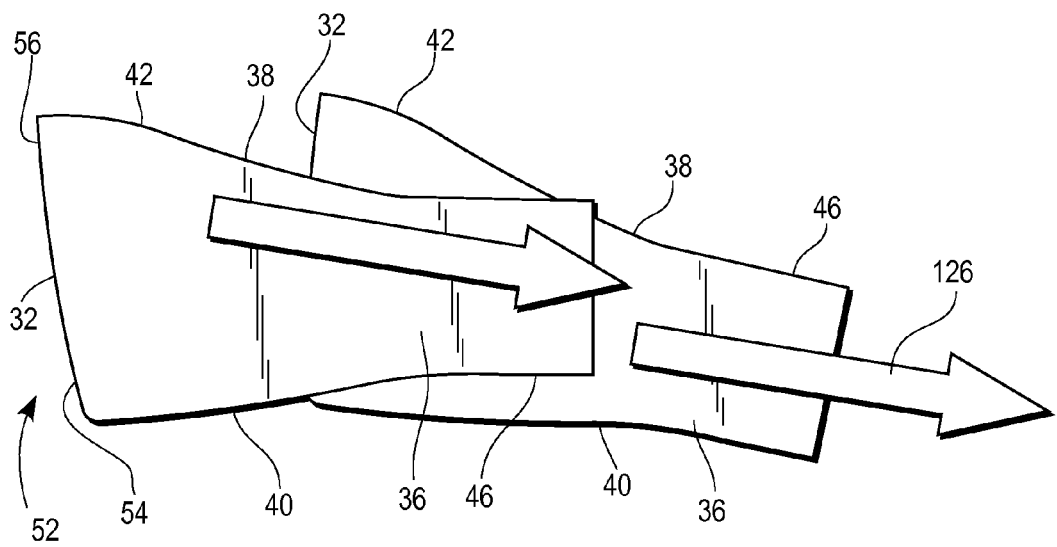
FIG. 7 is a schematic illustration of the behavior of the link during the initial phases of a collision.

The pivot link 16 exhibits a taper proceeding from the front mounting portion 42 to the rear mounting portion 46. As seen in FIG. 7, the taper is such that the vertical thickness of the pivot link 16 at the front mounting portion 42 is greater than the vertical thickness at the rear mounting portion 46. Also, the rear mounting portion 46 is located in a position vertically offset from the front mounting portion 42. In this regard, the rear mounting portion 46 is not centered relative to the front mounting portion 42, but is instead vertically displaced downward in the direction of the lower surface 40.

Referring back to FIGS. 1 and 3, front side rail 14 extends rearward from the bumper 12 generally along the X-axis. The front side rail 14 is preferably a box structure with a hollow construction to enhance its strength, and maybe formed either as a one-piece member or by multiple pieces joined together. Regarding the latter construction, a lateral side member 58 may be rigidly secured to a U-channel member 60 by welding or other means. The hollow nature of the front side rail 14 allows the side rail 14 to collapse in the direction of the X-axis or to buckle in the direction of the Y-axis during a collision or forces are directed to the front side rail 14. In this regard, the front side rail 14 is seen as including an inner wall 62, an outer wall 64, an upper wall 66, and a lower wall 68. For the sake of discussion, however, the front side rail 14 will be described as being a unitary piece.

Figure 8:
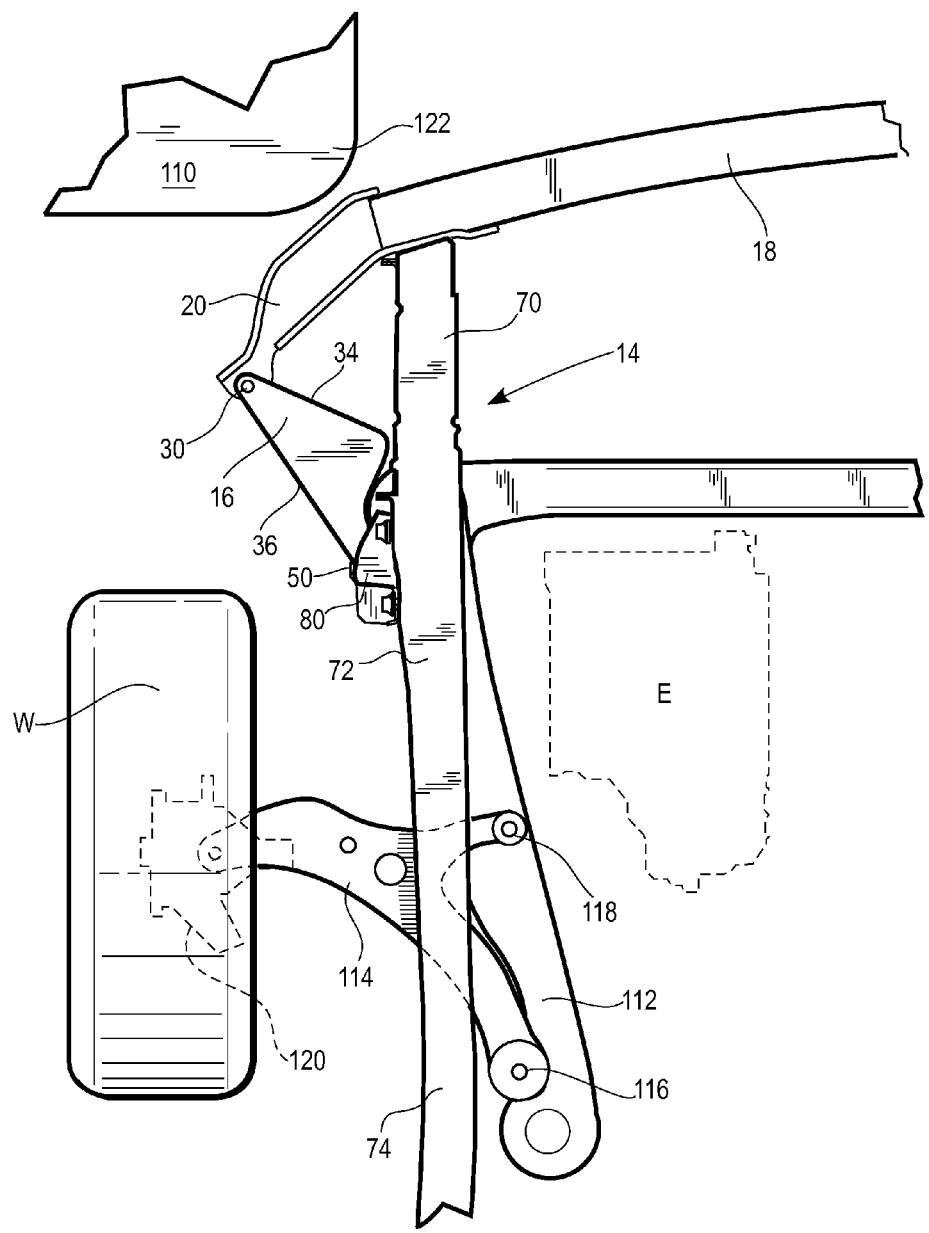
FIGS. 8-12 are top plan views of the countermeasure assembly of FIG. 1 showing various states of the countermeasure assembly during a collision with a barrier.

The front side rail 14 generally includes three portions: a front portion 70, an intermediate portion 72 and a rear portion 74. The front portion 70 is mounted to the bumper 12 generally at the interface between the main bumper 18 and the bumper extension 20. This mounting may be facilitated by conventional means including the use of bolts, screws or welding. The front portion 70 may also include indentations or reliefs 76 whose function is to reduce the compressive strength of the front side rail 14 and allow control of deformation, and more specifically crushing, of the front portion 70 during a collision. The front portion 70 transitions into the intermediate portion 72 which is located generally adjacent to the vehicle wheel W, as is seen in FIG. 8. The intermediate portion 72 includes a tapered section such that the forward part of the intermediate portion 72 has an increased width relative to the rearward part of the intermediate portion 72. This taper allows the intermediate portion to deform in a controlled manner, generally inward, during a collision. The intermediate portion 72 transitions into the rear portion 74 generally at a position toward the rearward end of the wheel W. This rear portion 74 ultimately extends under the passenger cabin area and may have cross members and vertical members associated with defining the passenger cabin, such as the A-pillar, attached thereto. Accordingly, the front side rail 14 extends generally from the bumper 12 to the passenger cabin of the vehicle.

As previously noted, the pivot link 16 is mounted between the bumper 18 and the front side rail 14. More specifically, the pivot link 16 extends from the front pivot joint 30 to the rear pivot joint 50, the latter being positioned along the front side rail 14 either at the rearward part of the front portion 70 or the forward part of the intermediate portion 72.

The rear pivot joint 50 is formed by the rear mounting portion 46 of the pivot link 16 and a pivot bracket 80 mounted to outer wall 64 of the front side rail 14. Similarly to the bumper extension 20, the pivot bracket 80 includes a pair of opposed flanges 82 that extend generally horizontally and laterally outward from the front side rail 14. Formed in the flanges 82 are apertures 84 that define the pivot axis of the rear pivot joint 50. The rear mounting portion 46 of the pivot link 16 is received within the space between the flanges 82 and the pivot bore 48 is aligned with the apertures 84. A pivot pin 86 extends through the apertures 84 and bore 48, along the pivot axis, and retains the rear mounting portion 46 with the pivot bracket 80, thereby forming the rear pivot joint 50. The pivot pin 86 may be credibly engaged with a nut or with corresponding threads located within at least one of the apertures 84.

Figure 4:
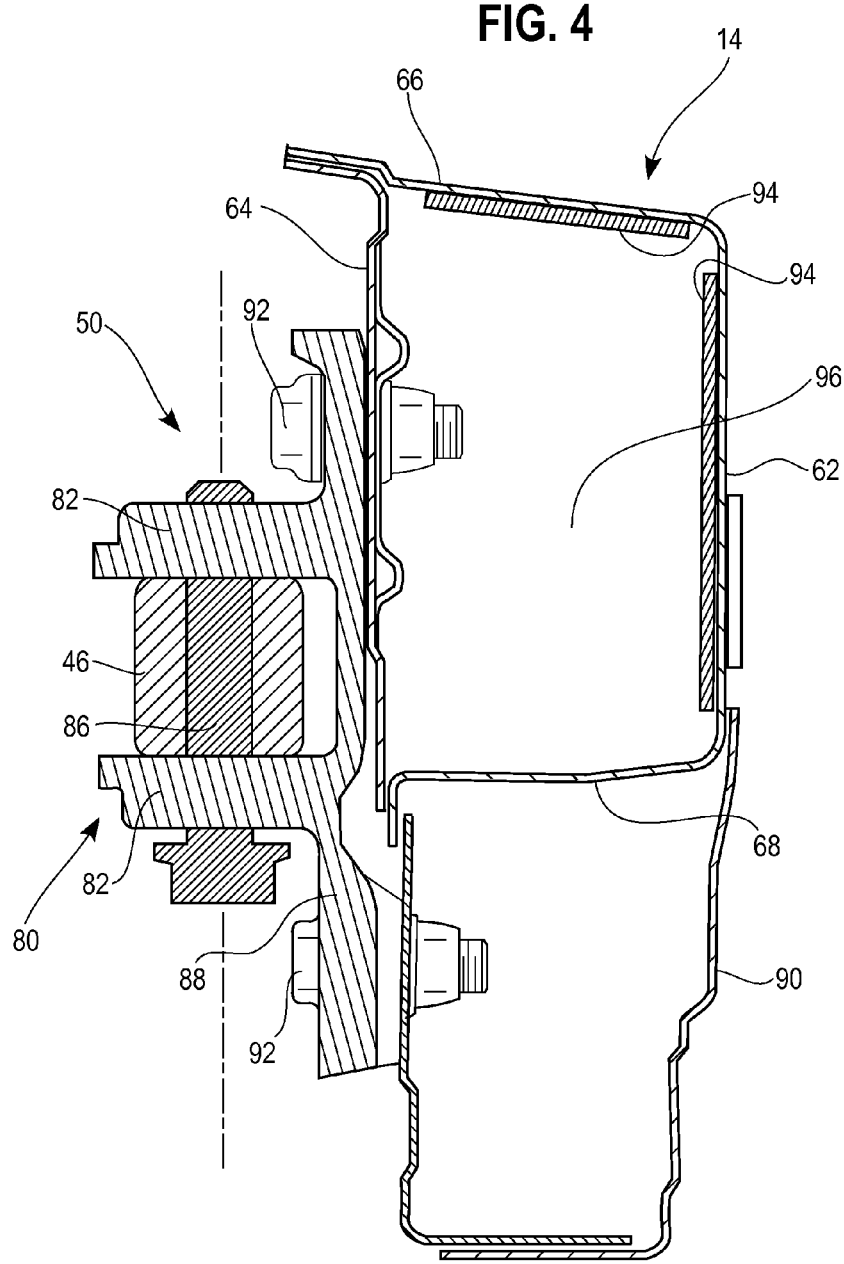
FIG. 4 is a cross-sectional view taken generally along line 4-4 in FIG. 3.
Figure 5:
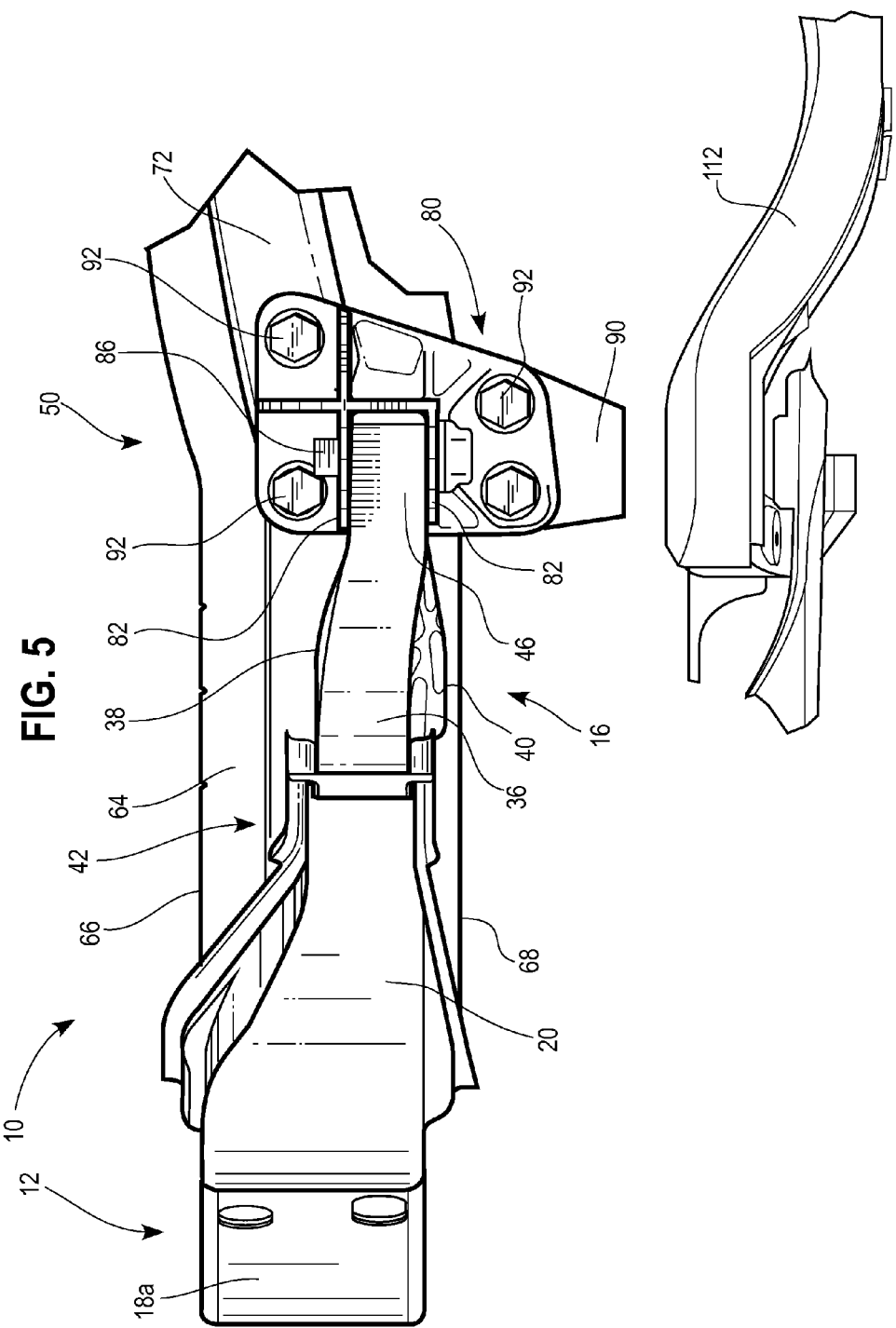
FIG. 5 is a side view of the countermeasure assembly seen in FIG. 1.

A base 88 of the pivot bracket 80 is secured, in part, to the front side rail 14. The base 88 is also secured to a lower extension 90. The lower extension 90 extends downward from the front side rail 14 and allows for the use of a longer base 88 for the pivot bracket 80. With the use of the lower extension 90, the location of the rear pivot joint 50 is lowered. In addition, the lower extension 90 also allows the base 88 of the pivot bracket 80 to be provided with an increased vertical length, which in turn allows the bolts 92 securing the bracket 80 to be spaced further apart. By spacing the means by which the bracket 80 is attached to the vehicle, or more specifically the attachment of the bracket to the front side rail 14 and the lower extension 80, the connection of the bracket 80 is able to withstand an increased amount of torque during a collision without separating from the front side rail 14 and the lower extension 90. As seen in FIG. 4, the length of the base 88 of the pivot bracket 80 can be made longer than the vertical height of the front side rail 14. Without the lower extension 90, an increase of this magnitude in the vertical length of the base 88 could not be achieved. Such a base of pivot bracket would be limited to the height of the front side rail 14.

To further enhance the strength of the front side rail 14 in the region where the rear pivot joint 50 is located, a bulkhead 94 is provided internally of the front side rail 14. The bulkhead 94 generally extends across the entire width of the cavity 96 defined within the front side rail 14 and includes flanges 98 or other structures that allow it to engage the front side rail 14. The flanges 98 may be provided with apertures 100 that are aligned with apertures 102 formed in the front side rail 14 and through which the bolts 92 securing the pivot bracket 80 are extended. While not previously mentioned, apertures 104 are provided in the pivot bracket 80 receiving the bolts 92 and securing the pivot bracket 80 the front side rail 14. While not previously mentioned, the lower extension 90 also includes apertures 106 for securing the pivot bracket 80 by way of the bolts 92.

When assembled, the bumper 12, longitudinal front side rail 14, and pivot link 16 provide a skeleton around the engine compartment, along with various other support members that support the vehicle suspension, engine components, or the like, as is known in the art. The front wheels W of the vehicle are disposed outboard of the intermediate portion 72, rearward from the pivot link 16 and bumper extension 20, but forward of the vehicle cabin structure C (see FIG. 8).

Having described the countermeasure assembly 10, the operation of the assembly 10 during a collision will now be described, with reference to FIGS. 6-12. The operation and function of the assembly 10 will be described with reference to an impact barrier 110 approaching the vehicle generally along the X-axis so as to create a small overlap frontal impact collision. It will be appreciated, however, that a vehicle including the countermeasure assembly 10 may be in motion or stationary, and that the impact barrier 110 may represent either a stationary object or a moving object. Also, it will be appreciated that the force exerted by the impact barrier 110 on the countermeasure assembly 10 might not be applied directly along the X-axis, and that this force may be obliquely directed or offset from the X axis.

Figure 6:
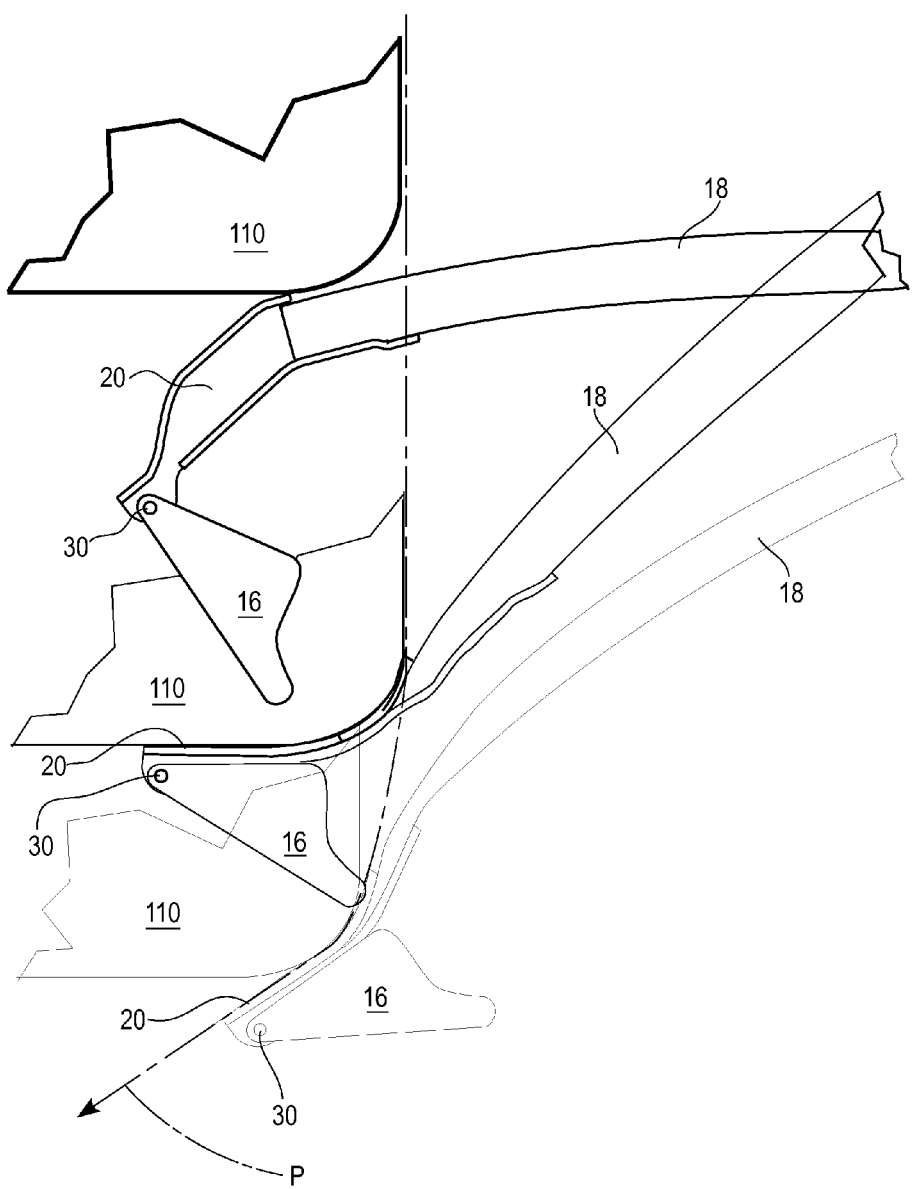
FIG. 6 is a schematic illustration of the countermeasure assembly of FIG. 1 showing the progression of the countermeasure assembly during a collision.

FIG. 6 schematically illustrates the path that the barrier 110 takes relative to the vehicle and the countermeasure assembly 10 with the pivot link 16 coupled to the bumper 12 and the front side rail 14. As a result of the interaction between the pivot link 16, the bumper extension 20 and the front side rail 14, and the location of the front and rear pivot joints 30, 50, the barrier 110 is gradually moved away from the vehicle along path P, while maintaining engagement with the pivot link 16. The maintained engagement with the pivot link 16 causes the force from the collision to be transferred and absorbed by the front side rail 14. Moreover, the inward buckling of the intermediate portion 72 of the front side rail 14 impacts the vehicle engine E and forcing the vehicle and the barrier 110 laterally away from one another. Thus, the barrier 110 can be directed away from the cabin C, while the countermeasure assembly 10 absorbs a large amount of the impact force by virtue of the deformation, crushing and buckling, of the front side rail 14.

FIG. 6 also illustrates the movement of the various components throughout the collision. More specifically, the pivot link 16 moves rearward relative to its normal operating position upon being contacted by the barrier 110. During this rearward movement, the pivot link 16 is caused to pivot in the counter-clockwise direction or outward direction. Similarly, the bumper 12, including the bumper extension 20, is forced rearward, with the bumper extension 20 becoming flattened, while maintaining its connection with the pivot link 16. The movement of the pivot link 16 is shown progressing from the pivot link 16 in the normal operating position, to the position of pivot link 16 as the barrier 110 begins to slide off of the pivot link 16.

With the enhanced strength connecting the pivot bracket 80 to the front side rail 14, no separation occurs between the pivot bracket 80 and the front side rail 14. With this connection remaining intact, forces resulting from the impact can be directed to ensure that the vehicle wheel W is not driven by the barrier 110 toward the passenger cabin of the vehicle. It will be appreciated that the vehicle wheel is connected to the lower suspension member 112 of the vehicle by a control arm 114. The rearward joint 116 of the control arm 114 is typically a very robust connection in the vehicle. The forward joint 118, however, is not as robust as the rearward joint 116. The countermeasure assembly 10 directs the forces generated by the barrier 110 such that these forces do not cause the control arm 114 to break at the forward joint 118. Rather, forces are directed through a relatively weaker component, namely the steering knuckle 120 associated with the wheel W. The steering knuckle 120 is generally weaker since it is formed as a metal casting.

Referring now to FIG. 8, the barrier 110 is shown immediately prior to colliding with the bumper 12 and a small overlap frontal impact collision. As seen therein, a corner 122 of the barrier 110 is generally aligned with the longitudinal axis of the front side rail 14 and will collide in the area of the bumper extension 20. Immediately after initial impact, the front side rail 14 will be crushed in its front portion 70 adjacent to the bumper 12, forming a crushed region. This initial impact causes the bumper extension 20 to partially flatten at the contact point with the corner 122 of the barrier 110. The rearward force on the bumper extension 20, in conjunction with the crushed region of the front side rail 14, causes the pivot link 16 to rotate outward (counterclockwise in FIG. 8) about the rear pivot joint 50. The front pivot joint 30 facilitates this rotation of the pivot link 16 without causing the pivot link 16 to separate from the bumper extension 20.

As the rear surface of the bumper extension 20 comes into contact with the inner surface 32 of the pivot link 16, the undercut 52 formed on the inner surface 32 causes the forward portion of the pivot link 16 to rotate slightly upward relative to the rear pivot joint 50. This rotation will proceed until the inner surface 32 is relatively flat against the bumper extension 20 and/or the barrier 110, at which point in time the vector of the force being transmitted through the countermeasure assembly 10 is redirected slightly downward as indicated by arrow 126. This redirection of the force vector 126 limits upward buckling of the front side rail 14 and may redirect components of the countermeasure assembly 10 downward into engagement with the lower suspension member 112, allowing the barrier 110 to remain in engagement with the countermeasure assembly 10 for greater length of time during a collision.

Figure 9:
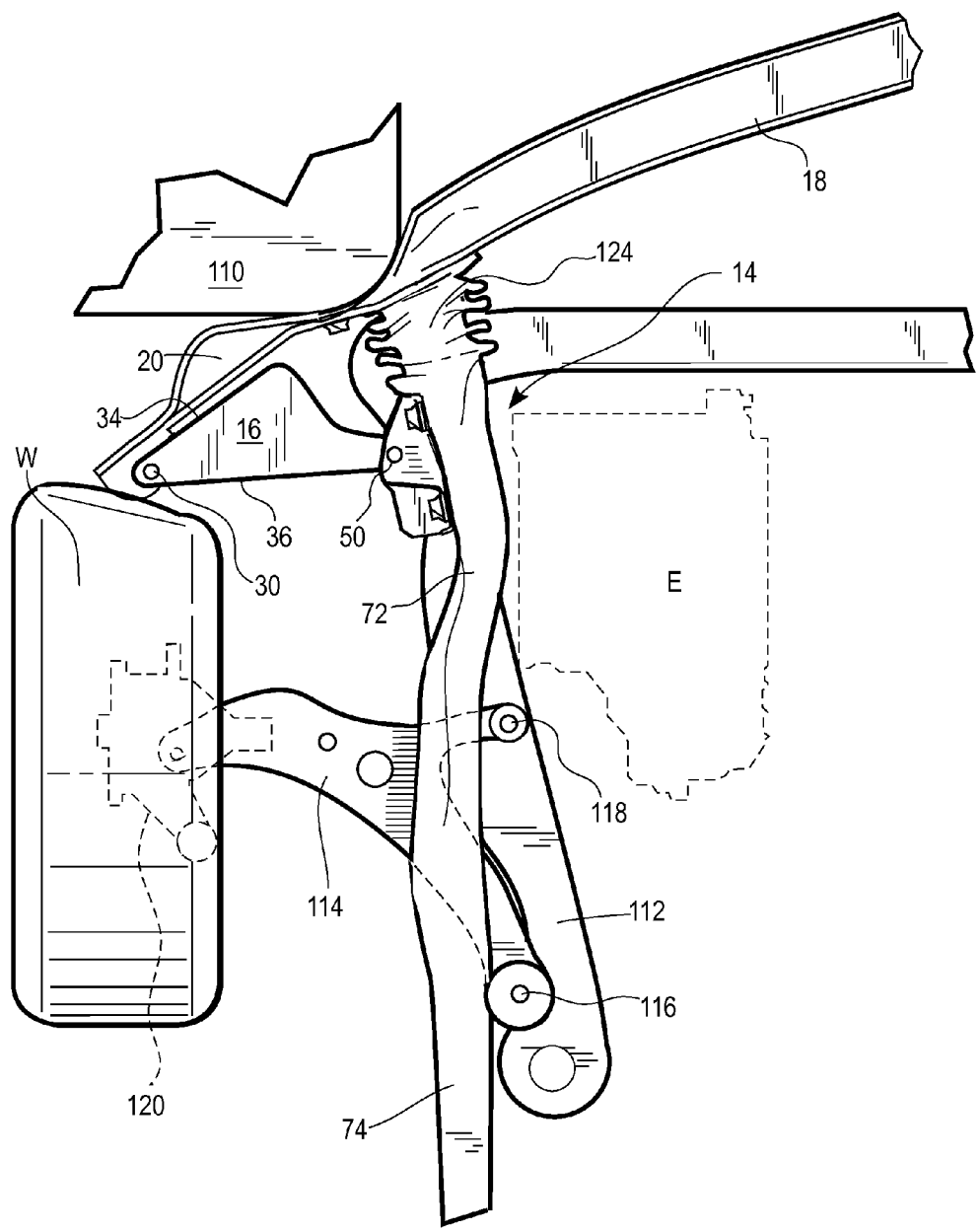
Figure 10:
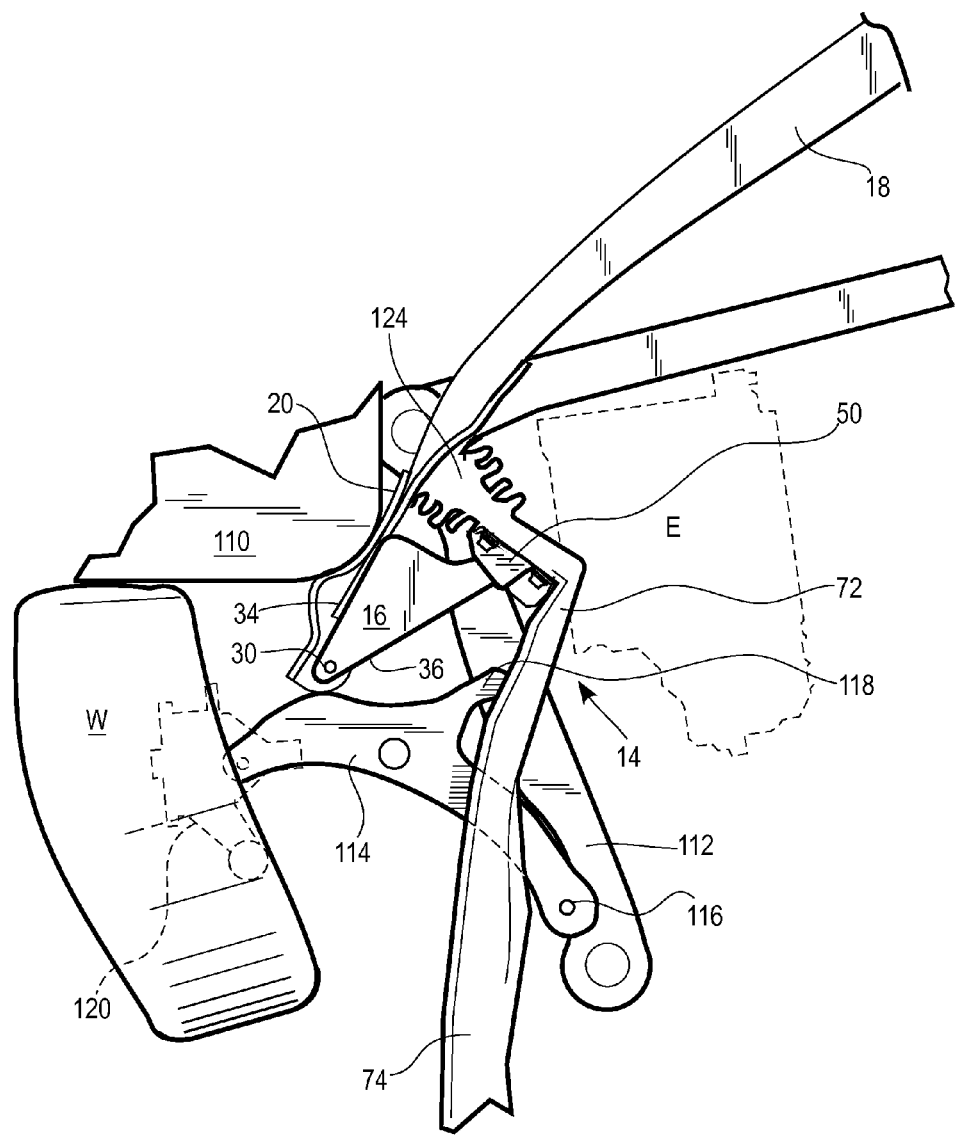
Figure 11:
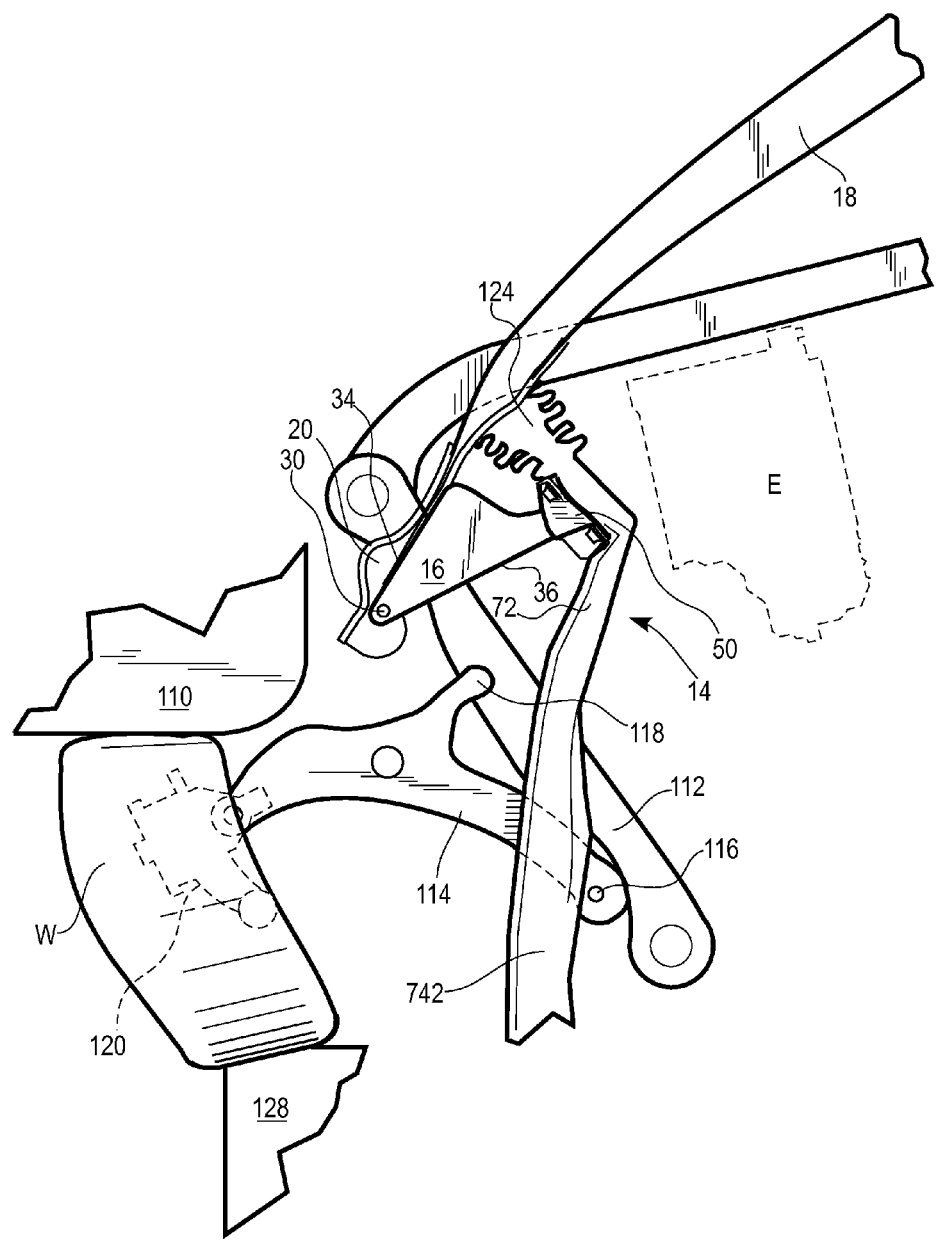
Figure 12:
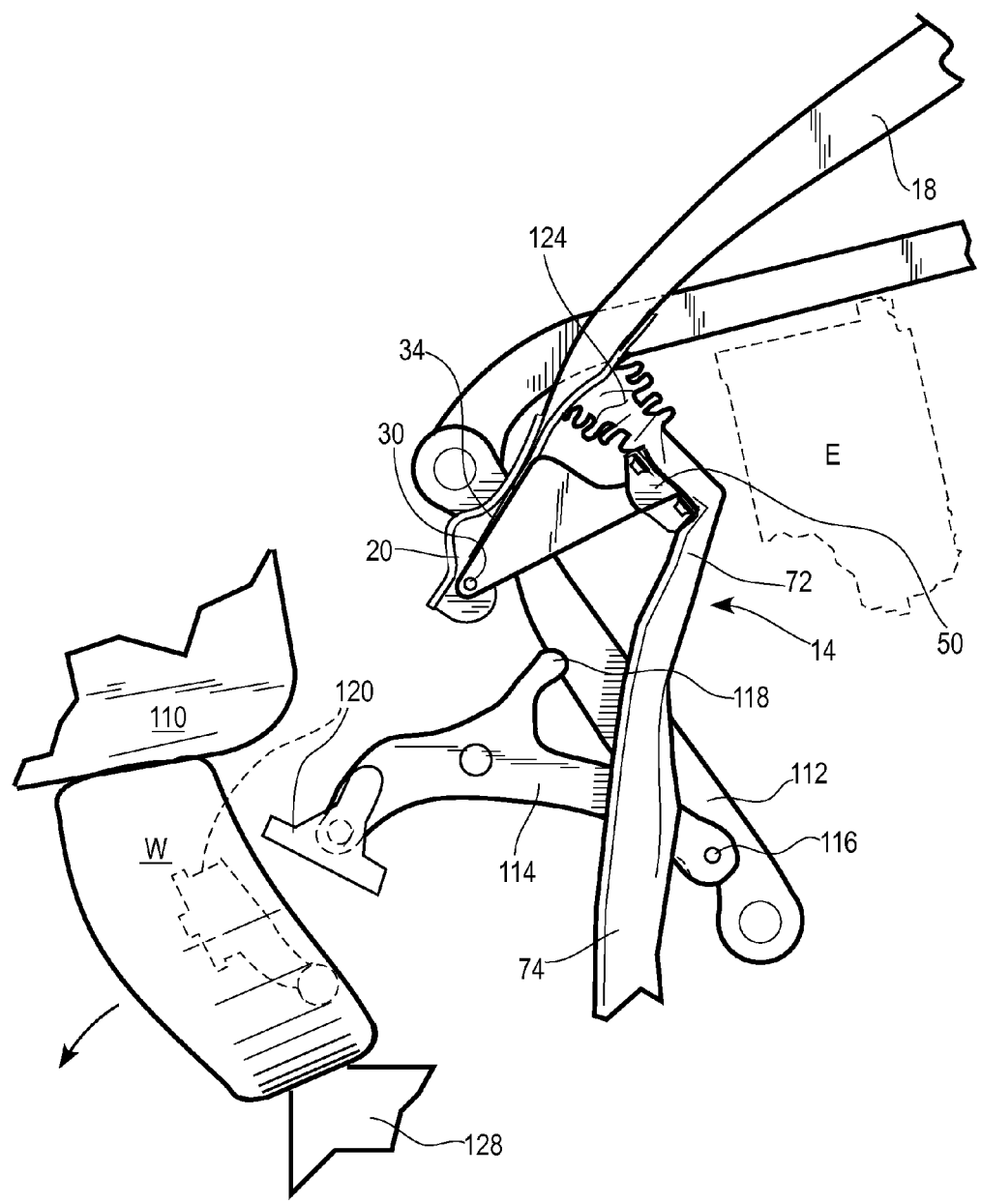

As seen in FIG. 9, as the barrier 110 continues to encroach upon the countermeasure assembly 10, the front portion 70 of the front side rail 14 has been substantially crushed, which is designated at 124, and the front side rail 14 begins to buckle inward towards the engine E. At this point, the pivot link 16 is pivoted to the location where it is extending laterally outward from the front side rail 14 and begins to engage portions of the wheel W. As the barrier 110 continues its encroachment into the countermeasure assembly 10, as seen in FIG. 10, the pivot link 16 continues rearward rotation and the front side rail 14 further buckles inward into engagement with the engine E. At this point, the barrier 110 has engaged a front portion of the lower suspension member 112. This engagement with the lower suspension member 112, along with the rearward and outward angle formed by rotation of the pivot link 16 and buckling of the front side rail 14, induces relative movement between the barrier 110 and the vehicle. This relative movement is such that the barrier 110 and the vehicle begin lateral movement away from each other, with the barrier 110 moving in the direction of the wheel W. Further movement of the barrier 110 displaces the countermeasure assembly 10 laterally inward such that the barrier 110 impinges the wheel W against a front corner of the cabin frame 128 of the passenger compartment. This cabin frame portion 128 is generally located at the rearward most extent of the wheel well within which the wheel W is located. By impinging the wheel W between the barrier 110 and the front corner of the cabin frame 128, the rim of the wheel W crushes and the force vectors 126 of the collision are specifically directed through the steering knuckle 120. This is generally illustrated in FIG. 11.

The steering knuckle 120 is not constructed of a material that can withstand the impact forces created by collision between the barrier 110 and the vehicle. As a result, the steering knuckle 120 fractures and the control arm 114 remains intact with the lower suspension member 112. Upon fracturing of the steering knuckle 120, the wheel W is free from the vehicle and allows the barrier to outward pivot off of the front corner of the cabin frame 128. As a further result, neither the barrier 110 nor the wheel W significantly impacts the passenger cabin of the vehicle as a result of the small overlap, front impact collision.

While the forces generated during a collision are not completely predictable, a countermeasure assembly 10 incorporating the principles of the embodiments of the present specification allows for a refocusing of the force vectors to a weaker structure of the vehicle, namely the steering knuckle 120, instead of focusing these forces on other components such as the control arm 14 this is achieved by maintaining the pivot link 16 connected to the front side rail 14, by virtue of the enhanced construction of the pivot bracket 80 and lower extension 90, during the full impact timeline of the collision.

As a person skilled in the art will readily appreciate, the above description is meant as an illustration of implementation of the principles of the various embodiments described herein. This description is not intended to limit the scope or application of the embodiments in that the embodiments are susceptible to modification, variation and change, without departing from spirit of this specification, as defined in the following claims.

We claim:

1. A frontal impact countermeasure assembly for a vehicle, the countermeasure assembly comprising:
    a front side rail extending in a generally longitudinal direction and having a forward end;
    a bumper extending generally transverse and lateral to the longitudinal direction of the front side rail and having a main bumper member and a bumper extension forming an end portion of the bumper, the bumper extension extending laterally from the main bumper member and forming an outboard end of the bumper, wherein the bumper extension is mounted to the forward end of the front side rail; and
    a pivot link having a front mounting portion and a rear mounting portion, wherein the front mounting portion is engaged with the bumper extension and the rear mounting portion is engaged with the front side rail.

2. The countermeasure assembly of claim 1, wherein:
    the bumper extension has a front member and a rear member; and
    the rear member is bolted to the forward end of the front side rail.

3. The countermeasure assembly of claim 2, wherein:
    the front side rail is a hollow box structure comprising an inner wall, an outerwall, an upper wall, and a lower wall; and
    bolts attaching the rear member of the bumper extension to the front side rail extend into a cavity of the hollow box structure through the forward end of the front side rail.

4. The countermeasure assembly of claim 2, wherein:
    the front member and the rear member of the bumper extension each comprise a pair of opposed flanges that extend substantially horizontally; and
    the front mounting portion of the pivot link is received within the pairs of opposed flanges.

5. The countermeasure assembly of claim 1, wherein:
    the front side rail defines a box structure including an outer wall, an inner wall, an upper wall and a lower wall; and
    an engagement of the rear mounting portion with the front side rail defines a rear pivot joint that includes a pivot bracket mounted to the outer wall of the front side rail and engaged with the rear mounting portion of the pivot link.

6. The countermeasure assembly of claim 5, wherein:
    the outer wall defines a vertical height of the front side rail; and
    the pivot bracket has a base defining a length greater than the vertical height of the front side rail.

7. The countermeasure assembly of claim 6, further comprising a lower extension extending downward from the lower wall of the front side rail, wherein the base of the pivot bracket is further fastened to the lower extension.

8. The countermeasure assembly of claim 7, wherein the lower extension defines an outer wall that is generally planar with the outer wall of the front side rail.

9. The countermeasure assembly of claim 8, wherein the lower extension defines a box structure.

10. The countermeasure assembly of claim 5, wherein:
    a bulkhead with a flange is disposed inside the front side rail; and
    the flange is bolted to the pivot bracket through the front side rail.

11. The countermeasure assembly of claim 10, wherein the bulkhead extends across an entire width of a cavity defined by the box structure of the front side rail.

12. The countermeasure assembly of claim 10, wherein the pivot bracket and the bulkhead are arranged laterally outward from and longitudinally overlapping with an engine of the vehicle.

13. The countermeasure assembly of claim 10, wherein:
    the bulkhead is substantially U-shaped and is positioned in the front side rail such that the U-shape of the bulkhead opens outward; and
    the bulkhead forms a closed cavity with the outer wall of the front side rail.

14. The countermeasure assembly of claim 13, wherein:
    a pivot bore of the rear mounting portion of the pivot link is aligned with apertures formed in the pivot bracket, the apertures defining a pivot axis of the rear pivot joint; and
    the pivot axis is aligned with the bulkhead and positioned outward from the bulkhead.

15. The countermeasure assembly of claim 14, wherein:
    the pivot bracket is secured to the front side rail with at least one front bolt and at least one rear bolt;
    the closed cavity is located between the at least one front bolt and the at least one rear bolt in a longitudinal direction; and
    the pivot axis of the rear pivot joint is located between the at least one front bolt and the at least one rear bolt in a longitudinal direction.

16. The countermeasure assembly of claim 10, wherein:
    the pivot bracket includes a pair of opposed flanges that extend generally horizontally and laterally outward from the front side rail, the pair of opposed flanges being connected to and spaced apart by a vertical wall of the pivot bracket; and the rear mounting portion of the pivot link is received between the pair of opposed flanges.

17. The countermeasure assembly of claim 1, wherein:
an engagement of the front mounting portion with the bumper extension defines a front pivot joint;
an engagement of the rear mounting portion with the front side rail defines a rear pivot joint; and
a center of the front pivot joint is offset from a center of the rear pivot joint in a vertical direction relative to the vehicle.

18. The countermeasure assembly of claim 17, wherein the center of the front pivot joint is vertically higher than the center of the rear pivot joint relative to the vehicle.

19. The countermeasure assembly of claim 1, wherein the rear mounting portion of the pivot link has a thickness that is less than a thickness of the front mounting portion of the pivot link.

20. A frontal impact countermeasure assembly for a vehicle, comprising:
a front side rail extending in a generally longitudinal direction to a forward end;
a bumper comprising a main bumper member and a bumper extension coupled to the forward end of the front side rail with fasteners extending through the forward end of the front side rail and into a cavity of the front side rail and the bumper extension is coupled to at least a portion of the main bumper member outboard of the front side rail; and
a pivot link comprising a front mounting portion and a rear mounting portion, wherein the front mounting portion is engaged with the bumper extension and the rear mounting portion is engaged with the front side rail.

* * * * *